Figure 1:
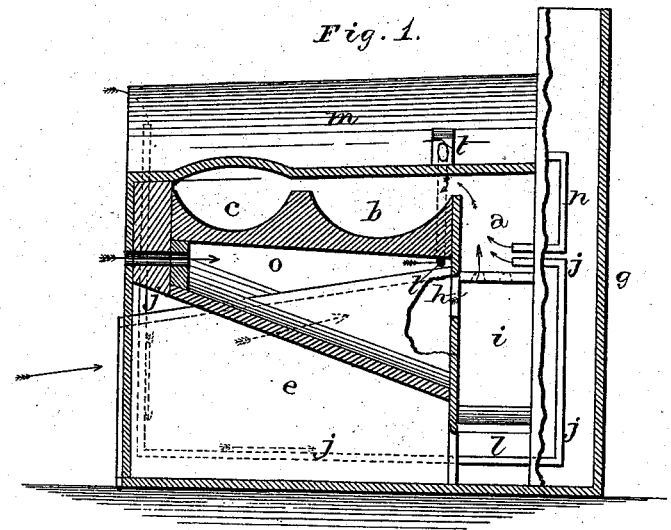
Figure 2:
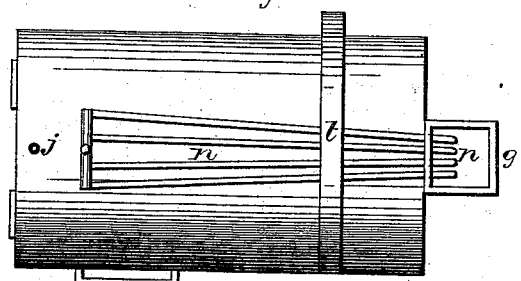
Figure 3:
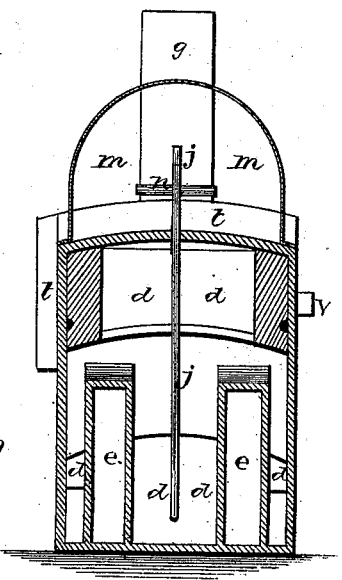
Figure 4:
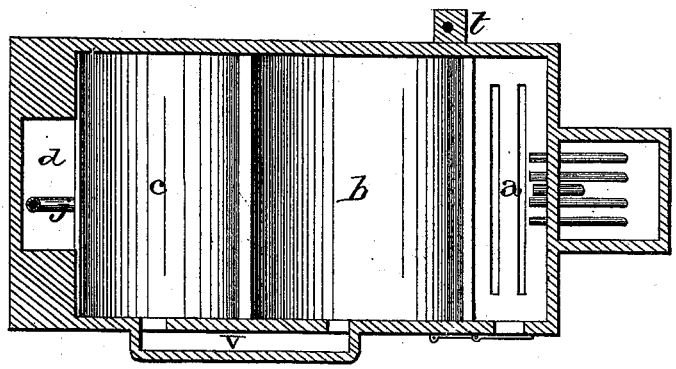

2 Sheets—Sheet 1.

W. L. McNAIR & W. GRAFF.
PUDDLING-FURNACE.

No. 176,977. Patented May 2, 1876.

WITNESSES:
J. Wm. Garner
F. M. Burnham

INVENTORS
Wm. L. McNair
Wm. Graff
per
F. A. Lehmann,
Atty.

2 Sheets—Sheet 2.

W. L. McNAIR & W. GRAFF.
PUDDLING-FURNACE.

No. 176,977. Patented May 2, 1876.

WITNESSES:
J. Wm Garner
G. Walter Gibbons

INVENTORS.
Wm. L. McNair
Wm. Graff
per
F. A. Lehmann, Atty.

UNITED STATES PATENT OFFICE.

WILLIAM L. McNAIR AND WILLIAM GRAFF, OF PITTSBURG, PA.

IMPROVEMENT IN PUDDLING-FURNACES.

Specification forming part of Letters Patent No. 176,977, dated May 2, 1876; application filed February 15, 1876.

*To all whom it may concern:*

Be it known that we, WILLIAM L. MCNAIR and WILLIAM GRAFF, of Pittsburg, in the county of Allegheny and State of Pennsylvania, have invented certain new and useful Improvements in Furnaces; and we do hereby declare the following to be a full, clear, and exact description of the invention, such as will enable others skilled in the art to which it pertains to make and use it, reference being had to the accompanying drawings, which form part of this specification.

Our invention relates to an improvement in furnaces; and it consists in the arrangement and combination of parts that will be more fully described hereinafter, whereby either oil, coal, or gas can be used as fuel in reducing and working the iron.

The accompanying drawings represent our invention.

$a$ represents the furnace; $b$, the puddling-chamber, placed next to the fire, and $c$ the reducing-chamber. The same heat that is used to puddle the iron is used to smelt it; but as a greater heat is required to keep the iron in a good working order the puddling-chamber is placed nearest to the fire. Where this order is reversed the iron gets cooled off to such a degree that it becomes too thick and tough to be worked. The products of combustion pass down through the flue $d$, over the top of the rear ends and both sides of the air-passages $e$, and thence up the chimney $g$.

The air-passages may be built of brick or any other suitable material that will absorb the heat, and so heat the air that is passing through them to a high degree. This air passes from the passages through the openings $h$ into the ash-pit $i$ just below the grate, and thus supplies oxygen to the fire.

In the furnace $a$ there may be used either coal, gas, or oil, as fuel. When it is desired to use oil it is passed in through the pipe $j$, which passes down through the flue $d$, on across the chamber $l$, up the chimney, and out into the furnace.

In order to cause a thorough commingling of the air and gas, and thus insure a perfect combustion when gas is used, the air, instead of being introduced just beneath the grate-bars, may be carried over in a flue, so as to be discharged either just above or below the discharge of the gas. The oil pipe or flue $j$ being subjected to all the heat of the products of combustion that are passing through the flue $d$ and up the stack, all of the oil contained therein is converted into gas before it reaches the furnace. If desired to superheat this gas the pipe through which it passes may be arranged in coils in the chamber $l$. Upon the top of the furnace is formed a chamber, $m$, which is heated its whole length from below, and in this chamber is arranged a series of pipes, $n$, through which gas is passed for the purpose of being heated on its way to the furnace. Underneath the puddling and smelting chambers, and on top of the flue $d$ and air-passages $e$, is formed a chamber, $o$, which is heated both from above and below, and through which air is passed for the purpose of being heated. From this chamber $o$ the air passes upward into the flue $t$, that passes through the chamber $m$ across the top of the puddling-furnace. From this flue there are made openings downward, so as to discharge the heated air directly over the bridge, and thus furnish oxygen to the flame at the place where it is most needed.

Where air and gas are to be mingled the air should always be admitted from above, as it is the heaviest, and in passing downward will be thoroughly mixed with the gas.

The melting and puddling chambers are connected by an outside trough, $v$, so that the iron, after being melted, can at once be run into the puddling-chamber.

If so desired, the pipes that convey the oil and gas to the furnace may be arranged in coils wholly inside of the furnace-stack, and be heated by the waste heat instead of as here shown.

If desired, both oil and gas may be used together, or either one or both of them in connection with coal, according to the heat desired.

This furnace may be used for heating, smelting, or puddling, as may be desired.

Having thus described our invention, we claim—

1. The combination of the furnace $a$, one or more puddling or melting chambers, $b$ $c$, the hot-air chamber $o$, with connecting-flue $t$, for supplying air over the top of the bridge of the furnace, and air-passages $e$, arranged in the flue $d$ for supplying air to the furnace $a$, substantially as herein shown and described.

2. The combination of the furnace $a$, puddling or melting chamber $b$, hot-air chamber $m$, gas-pipes $n$, arranged therein, and hot-air chamber $o$, with connecting-flue $t$, for supplying air over the bridge of the furnace, substantially as specified.

In testimony that we claim the foregoing we have hereunto set our hands this 18th day of January, 1876.

WILLIAM L. McNAIR.
WILLIAM GRAFF.

Witnesses:
ROBT. M. BARR,
F. A. LEHMANN.